A. B. Zellner,
Stirrup Strap Loop.
No. 87,749. Patented Mar. 9, 1869.
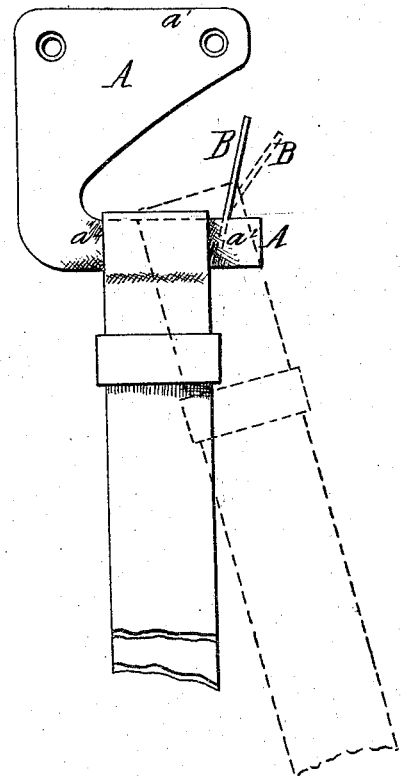
Witnesses
E. Wolff
Wm A Mingay
Inventor
A. B. Zellner.
pr. Munn & Co
Attorneys

A. B. ZELLNER, OF MONTICELLO, ARKANSAS.

Letters Patent No. 87,749, dated March 9, 1869.

IMPROVED STIRRUP-STRAP LOOP.

The Schedule referred to in these Letters Patent and making part of the same.

*To all whom it may concern:*

Be it known that I, A. B. ZELLNER, of Monticello, in the county of Drew, and State of Arkansas, have invented a new and useful Improvement in Stirrup-Strap Loops; and I do hereby declare that the following is a full, clear, and exact description thereof, which will enable others skilled in the art to make and use the same, reference being had to the accompanying drawings, forming part of this specification, in which the figure is a side view of my improved stirrup-strap loop.

My invention has for its object to furnish an improved stirrup-strap loop, which shall be so constructed and arranged, that should the rider be thrown, or fall from the horse, the stirrup-strap may become disengaged from the loop, so as to guard against the person's being dragged by the foot, should it accidentally become caught in the stirrup; and It consists in the combination of a whalebone spring with the horizontal arm of the loop, as hereinafter more fully described.

A is the loop, the upper part or plate, $a^1$, of which is secured to the saddle-tree by screws or other secure means.

The lower part, or arm, $a^2$, extends out rearwardly, to receive the stirrup-strap.

B is a spring, which is made of whalebone, and the lower end of which is inserted and secured in a socket prepared for its reception in the end part of the arm $a^2$, and the upper, or free end of which projects upward and rearward, as shown in the drawings.

By using the whalebone spring B, I guard against its being injured by the salty sweat of the horse, which, when metallic springs are used, soon rusts them and renders them useless.

By this construction and arrangement of the spring B, should the stirrup-strap be drawn back, as it must necessarily be should the rider fall or be thrown from the horse, the rear edge of the said strap will rise, and slide upon the spring B, drawing the said spring down, and allowing the said strap to slip from the arm of the loop A, detaching the stirrup.

Having thus described my invention,

I claim as new, and desire to secure by Letters Patent—

The whalebone spring B, in combination with the horizontal arm $a^2$ of the stirrup-loop A, substantially as herein shown and described, and for the purpose set forth.

A. B. ZELLNER.

Witnesses:
W. A. HAMBY,
WM. P. MONTAGUE.